Figure 1:
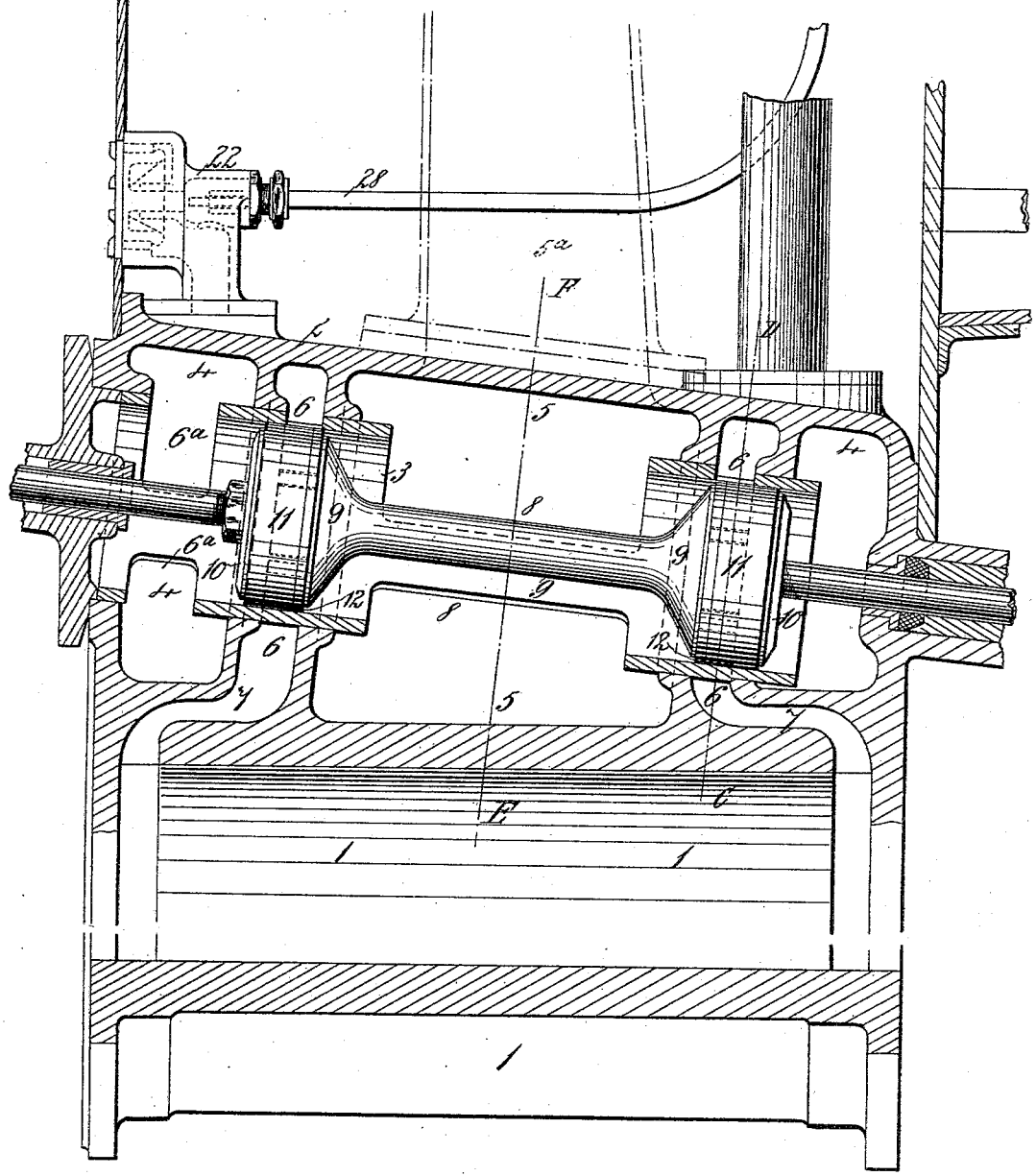

(No Model.) 5 Sheets—Sheet 1.
W. M. SMITH.
VALVE FOR ENGINES.

No. 425,264. Patented Apr. 8, 1890.

Witnesses
Robert Stirling
Michael John Keeney

Inventor:
Walter MacPherson Smith (No Model.) W. M. SMITH. 5 Sheets—Sheet 2.
VALVE FOR ENGINES.
No. 425,264. Patented Apr. 8, 1890.
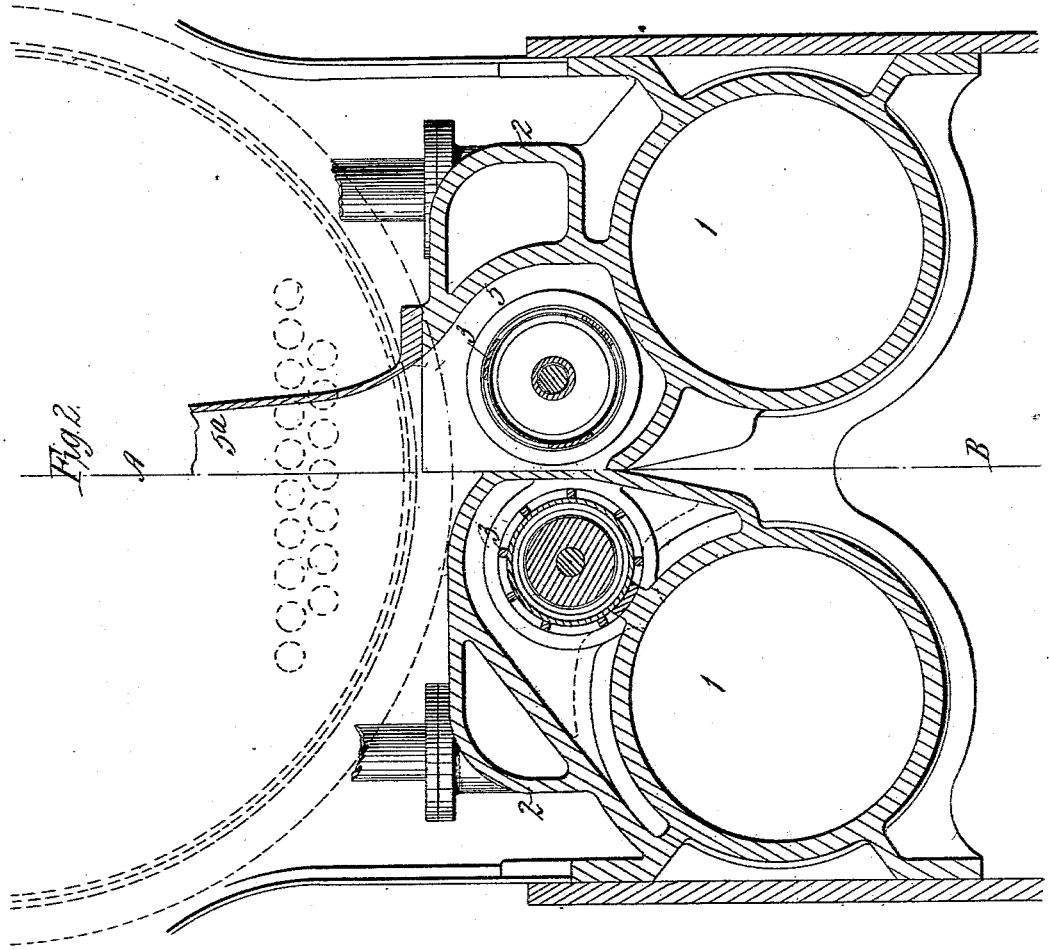

(No Model.) W. M. SMITH. 5 Sheets—Sheet 3.
VALVE FOR ENGINES.
No. 425,264. Patented Apr. 8, 1890.
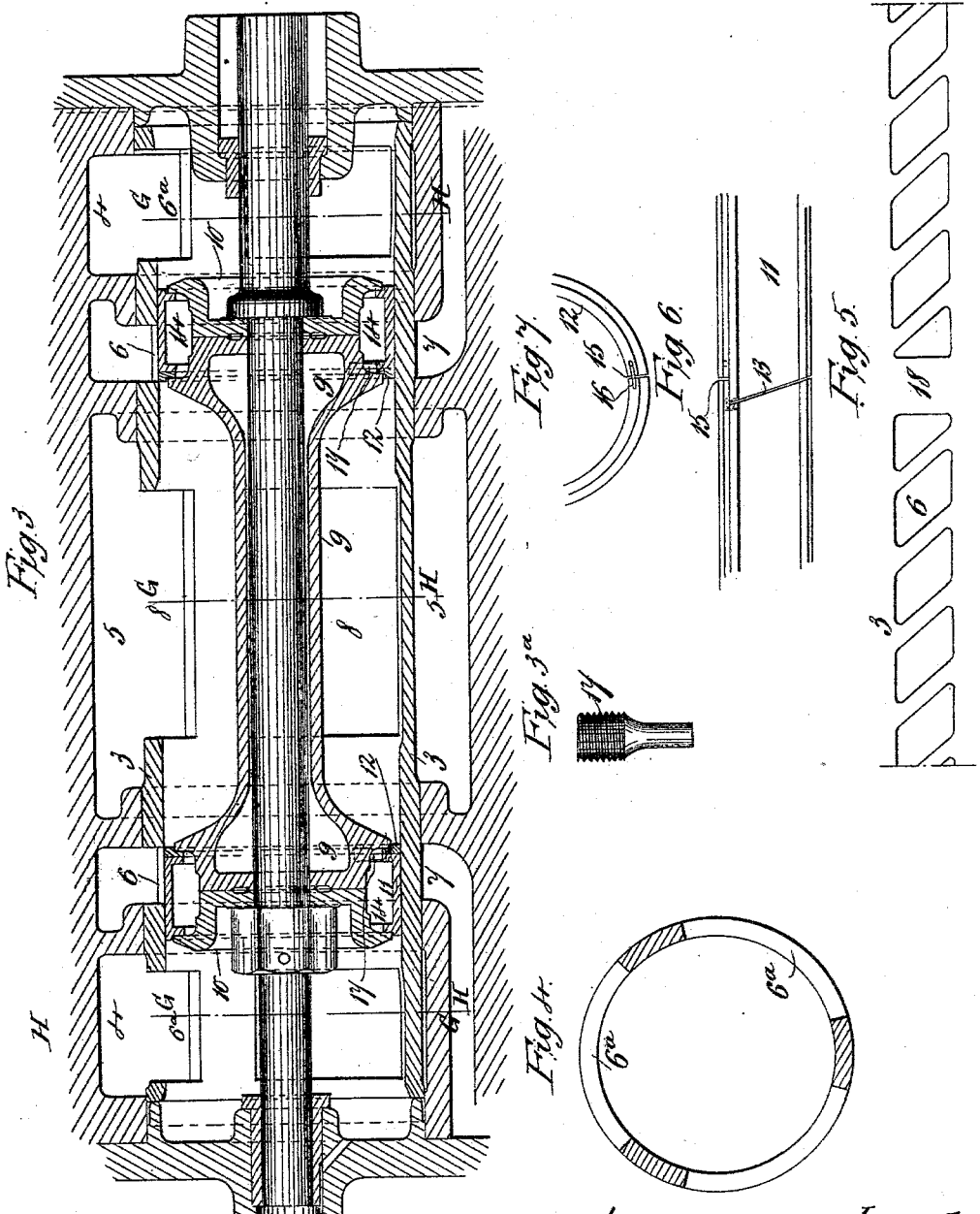

(No Model.) 5 Sheets—Sheet 4.
W. M. SMITH.
VALVE FOR ENGINES.
No. 425,264. Patented Apr. 8, 1890.
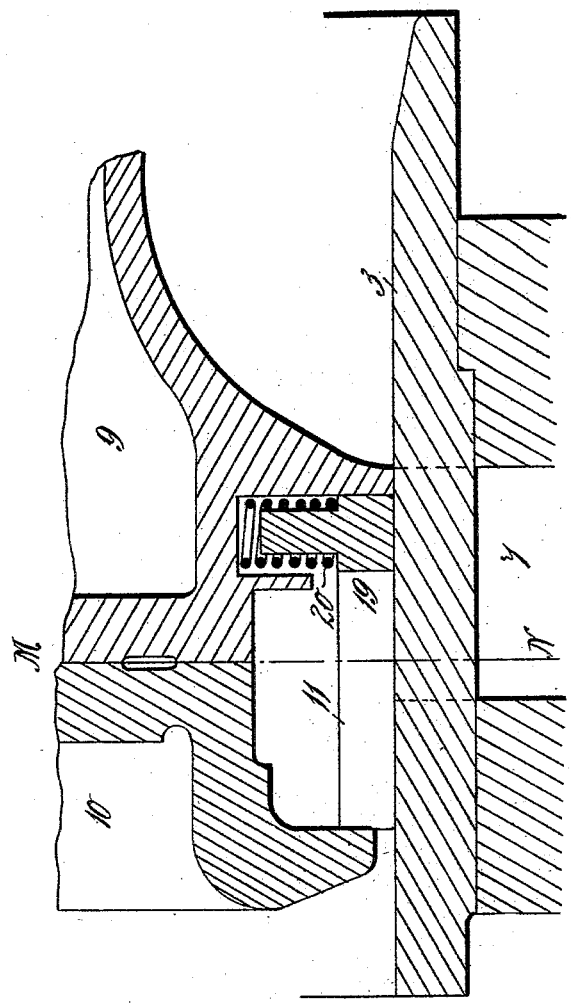

(No Model.)  5 Sheets—Sheet 5.
W. M. SMITH.
VALVE FOR ENGINES.
No. 425,264.  Patented Apr. 8, 1890.
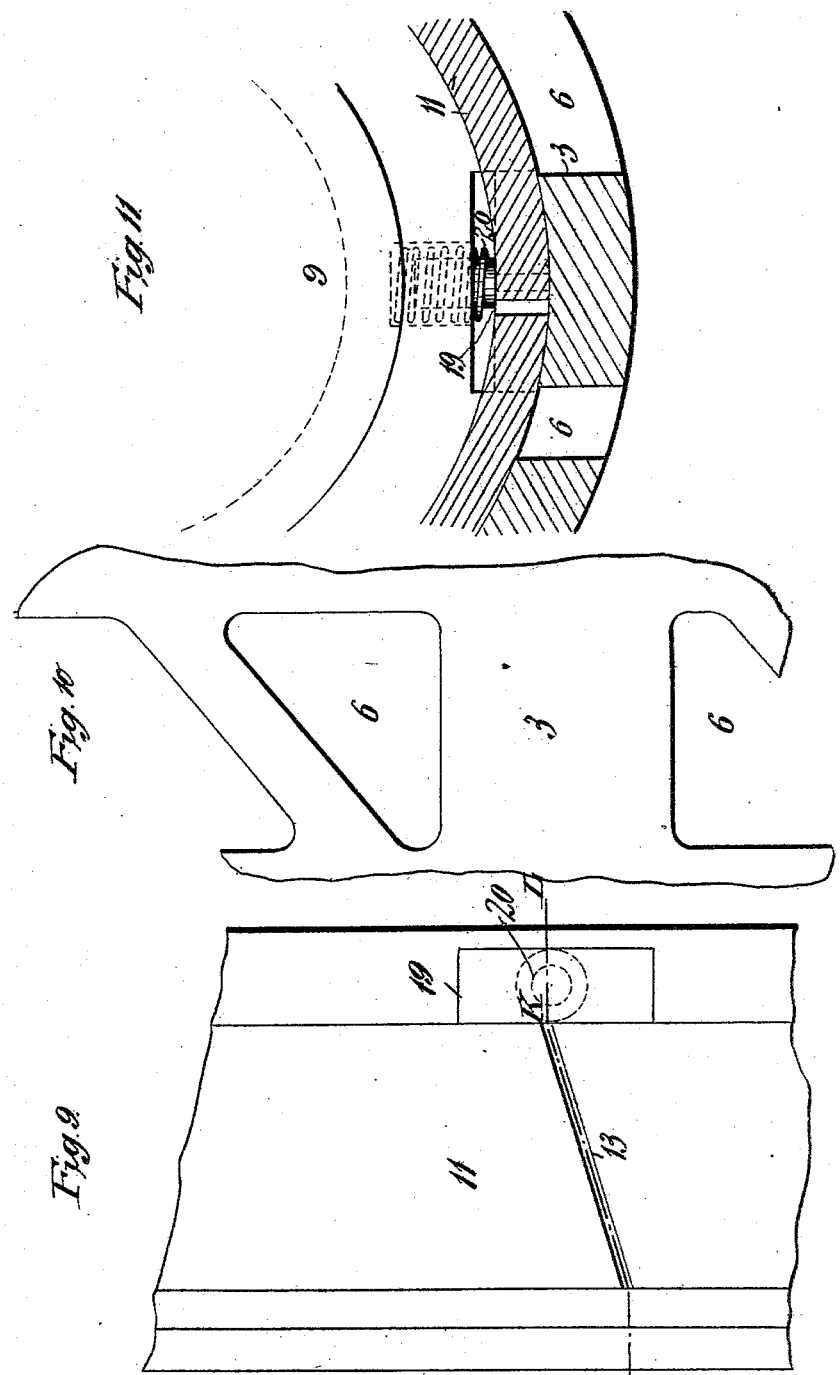

UNITED STATES PATENT OFFICE.

WALTER MACKERSIE SMITH, OF JESMOND, NEWCASTLE-UPON-TYNE, COUNTY OF NORTHUMBERLAND, ENGLAND.

VALVE FOR ENGINES.

SPECIFICATION forming part of Letters Patent No. 425,264, dated April 8, 1890.

Application filed July 3, 1889. Serial No. 316,477. (No model.) Patented in England December 6, 1888, No. 17,833; in France June 5, 1889, No. 198,750, and in Belgium June 5, 1889, No. 86,529.

*To all whom it may concern:*

Be it known that I, WALTER MACKERSIE SMITH, a subject of the Queen of Great Britain and Ireland, residing at Jesmond, Newcastle-upon-Tyne, in the county of Northumberland, England, have invented Improvements in Valves for Locomotives and other Steam-Engines, (for which patents have been obtained in England, No. 17,833, dated December 6, 1888; France, No. 198,750, dated June 5, 1889, and Belgium, No. 86,529, dated June 5, 1889,) of which the following is a specification.

The objects of this invention are, first, to keep the packing-rings of the piston-valves used for distributing the steam tight against the liners or interiors of the cylinders within which such piston-valves work in the steam-chest, and, secondly, to balance or counteract the steam-pressure which at certain periods comes against the outside of the rings.

Referring now to the annexed illustrative drawings, Figure 1 shows, partly in section and partly in elevation, so much of a locomotive-engine as is necessary to illustrate the application thereto of the present invention. Fig. 2 is a transverse section to a smaller scale, in which the part to the left of the vertical center line A B is taken on the line C D of Fig. 1, and the part to the right of the line A B is taken on the line E F of Fig. 1. Fig. 3 is a longitudinal vertical section to a larger scale of the steam-chest, with the liner and piston-valves shown in Fig. 1. Fig. 4 is a transverse section on the lines G H of Fig. 3. Fig. 5 is a development of one set of steam-ports in the liner. Fig. 6 is a part development of one of the piston-rings. Fig. 7 is a part end elevation of one of the piston-rings. Fig. 8 is a part section of a modified form of piston-valve with liner and cylinder, this section being through the line I K L of Fig. 9. Fig. 9 is a side elevation of part of the piston-valve and ring shown in Fig. 8. Fig. 10 is a developed view showing part of the set of steam-ports. Fig. 11 is a part transverse section taken through the line M N of Fig. 8.

The several figures are drawn to different scales.

1 1 are the working-cylinders of the engine. 2 2 are the steam-chests. 3 3 are the liners of the steam-chests. It is in these liners that the piston-valves work.

4 4 are live-steam spaces.

5, Fig. 1, is an exhaust-steam space.

6 6ª are steam-ports in the liner.

7 7 are cylinder-ports.

8 8 are exhaust-ports in the liner.

I will now describe one of the piston-valves. The body 9 of the piston-valve has a flange or junk-ring 10 fitted to it. It has likewise two rings 11 and 12, which work in the liner 3. It will be understood that the two valves connected as shown constitute a compound valve. Two sets of ports may be formed in the liner for each valve, the steam-ports 6 being shown in Fig. 5, and the ports 6ª, by which steam enters from the boiler, in Fig. 4; or, the liner or bearing for the piston-valves may be cast in one with the cylinder, in which case the steam-ports 6 only would be required. The exhaust-steam passes into the space between the two ends of the compound piston-valve, and thence through the exhaust-ports 8 to the exhaust-steam space 5. It will be seen that where the ring 11 is cut so as to allow it to be sprung into the liner 3 an opening or space 13, Figs. 6 and 7, is formed, through which the steam can pass into the chamber 14 behind the ring 11.

The ring 12 (or a part ring, as hereinafter specified) is a closing-ring to prevent escape of steam from chamber 14 to the exhaust, and it is this closing-ring or part ring applied to this purpose that constitutes the essential feature of my invention. This steam would escape through the opening 15 in the ring 12; but this opening is closed by a tongue 16, Fig. 7, which prevents the escape of steam from the steam-chamber 14 to the exhaust-chamber 5. When the valve travels so that steam is admitted to the steam-port 7, the steam presses on the outside circumference of the ring 11 and partly counterbalances the pressure on its inner side, and thereby reduces the friction between it and the liner. When steam is being admitted to the steam-port 7, the ring 12 will have traveled beyond the steam-port openings 6 in the liner and will only be exposed to the pressure of the steam on its inside circumference, which steam will press the ring into close contact with the interior of the liner, thereby forming a steam-tight joint.

The rings 11 and 12 are held in position by a stud 17, (shown separately in Fig. 3ª,) so that where they are cut they travel over a bridge 18, Fig. 5, formed in the liner 3, and thereby prevent the steam from passing into the cylinder by the steam-port 7 through the opening 13 in the ring 11. The ring 12 may also be made solid. In this case it should be a working-fit in the liner 3.

According to the modification shown in Figs. 8, 9, 10, and 11 one ring only is used. In this case the piston-valve is made a working-fit into the liner 3, and is fitted with a part closing-ring 19, placed opposite to the joint in the ring 11 and pressed against the liner 3 by the spring 20. If steam be admitted by the ends of the compound or duplex piston-valve, then each piston-valve must fit the liner on the inside, as shown in Fig. 8. If steam be admitted between the two piston-valves forming the compound piston-valve, then each piston-valve should fit the liner on the outside, or the piston-valve may fit the liner on both sides of the ring.

Although I have shown and described this invention as applied in a locomotive-engine, yet it is to be remarked that the improved construction of piston-valve may with advantage be used in steam-engines of other types.

What I claim is—

In a piston-valve, the combination, with the body 9, with its annular groove or recess forming steam-chamber 14, and spring packing-ring, with opening or space 13 to admit steam into said chamber, of a closing-ring or part ring subject to pressure on its inner circumference or surface and adapted to prevent escape of steam by said opening or space 13 from said chamber 14 to the exhaust, said closing-ring or part ring being, when steam is being admitted to the engine-cylinder, protected from pressure of steam on its outer circumference or surface by the liner or annular seat in which the valve works, substantially as herein described.

In testimony whereof I have signed my name to this specification in the presence of two subscribing witnesses.

WALTER MACKERSIE SMITH.

Witnesses:
 ROBERT STIRLING,
14 *Richmond Terrace, Gateshead-on-Tyne.*
 MICHAEL JOHN KEENEY,
9 *Rectory Terrace, Gosforth.*